US007805368B2

(12) United States Patent
Phillips et al.

(10) Patent No.: US 7,805,368 B2
(45) Date of Patent: *Sep. 28, 2010

(54) DEBIT PURCHASING OF STORED VALUE CARD FOR USE BY AND/OR DELIVERY TO OTHERS

(75) Inventors: Gregory Joseph Phillips, Landenberg, PA (US); Rebecca Deporte, Landenberg, PA (US); Jeffrey Norwine, Wilmington, DE (US); Penny Joines, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 11/755,810

(22) Filed: May 31, 2007

(65) Prior Publication Data

US 2007/0226141 A1    Sep. 27, 2007

Related U.S. Application Data

(63) Continuation of application No. 10/987,086, filed on Nov. 15, 2004, now Pat. No. 7,363,273, which is a continuation of application No. 10/441,067, filed on May 20, 2003, now Pat. No. 6,892,187, which is a continuation of application No. 09/102,044, filed on Jun. 22, 1998, now Pat. No. 6,615,189.

(51) Int. Cl.
    G06Q 40/00    (2006.01)
(52) U.S. Cl. ....................................................... 705/41
(58) Field of Classification Search .................... 705/38, 705/41
    See application file for complete search history.

(56) References Cited

U.S. PATENT DOCUMENTS

| 3,634,669 A | 1/1972 | Soumas et al. |
| 3,713,235 A | 1/1973 | Roberts |
| 3,855,033 A | 12/1974 | Staats |

(Continued)

FOREIGN PATENT DOCUMENTS

CA    2293321    12/1998

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner*—Susanna M Diaz
(74) *Attorney, Agent, or Firm*—Hunton & Williams LLP

(57) ABSTRACT

A method of issuing a purchase card is provided. The method includes the steps of presenting a purchaser with the opportunity to buy the purchase card, determining whether the purchaser has sufficient funds to pay for the purchase card, creating a purchase card account for a recipient designated by the purchaser, and issuing the purchase card. The purchase card may also be issued in connection with another credit card, for example as a rebate for purchases on the credit card. The purchase card may also be converted to a credit card.

20 Claims, 2 Drawing Sheets

U.S. PATENT DOCUMENTS

| | | | |
|---|---|---|---|
| 3,946,206 A | 3/1976 | Darjany | |
| 4,022,943 A | 5/1977 | Erb et al. | |
| 4,047,033 A | 9/1977 | Malmberg | |
| D248,203 S | 6/1978 | Morse | |
| 4,123,747 A | 10/1978 | Lancto et al. | |
| D259,048 S | 4/1981 | Peterson | |
| 4,380,699 A | 4/1983 | Monnier et al. | |
| 4,465,206 A | 8/1984 | Sorel et al. | |
| 4,479,995 A | 10/1984 | Suzuki et al. | |
| 4,545,838 A | 10/1985 | Minkus | |
| 4,575,127 A | 3/1986 | Michel | |
| 4,582,985 A | 4/1986 | Lofberg | |
| 4,594,663 A | 6/1986 | Nagata et al. | |
| 4,614,861 A | 9/1986 | Pavlov et al. | |
| 4,634,845 A | 1/1987 | Riley | |
| 4,642,768 A | 2/1987 | Roberts | |
| 4,643,452 A | 2/1987 | Chang et al. | |
| 4,647,714 A | 3/1987 | Goto | |
| 4,648,189 A | 3/1987 | Michel | |
| 4,669,730 A | 6/1987 | Small | |
| 4,689,478 A | 8/1987 | Hale et al. | |
| 4,700,055 A | 10/1987 | Kashkashian | |
| 4,707,594 A | 11/1987 | Roth | |
| 4,722,054 A | 1/1988 | Yorozu et al. | |
| 4,746,787 A | 5/1988 | Okada | |
| 4,750,119 A | 6/1988 | Cohen | |
| 4,752,676 A | 6/1988 | Leonard et al. | |
| 4,754,418 A | 6/1988 | Hara | |
| 4,755,661 A | 7/1988 | Ruebsam | |
| 4,766,293 A | 8/1988 | Boston | |
| 4,766,539 A | 8/1988 | Fox | |
| 4,777,563 A | 10/1988 | Teraoka et al. | |
| 4,789,928 A | 12/1988 | Fujisaki | |
| 4,817,949 A | 4/1989 | Bachman et al. | |
| 4,822,985 A | 4/1989 | Boggan et al. | |
| 4,831,242 A | 5/1989 | Englehardt | |
| 4,831,526 A | 5/1989 | Luchs | |
| 4,851,650 A | 7/1989 | Kitade | |
| 4,856,857 A | 8/1989 | Takeuchi et al. | |
| 4,866,545 A | 9/1989 | LaManna et al. | |
| 4,868,376 A | 9/1989 | Lessin et al. | |
| 4,870,259 A | 9/1989 | Boggan et al. | |
| 4,882,675 A | 11/1989 | Nichtberger | |
| 4,897,533 A | 1/1990 | Lyszczarz | |
| D305,887 S | 2/1990 | Nishimura | |
| 4,906,826 A | 3/1990 | Spencer | |
| 4,908,521 A | 3/1990 | Boggan et al. | |
| 4,923,288 A | 5/1990 | Allen et al. | |
| 4,928,001 A | 5/1990 | Masada | |
| 4,931,623 A | 6/1990 | Nakamura et al. | |
| 4,938,830 A | 7/1990 | Cannistra | |
| 4,941,090 A | 7/1990 | McCarthy | |
| 4,943,707 A | 7/1990 | Boggan | |
| 4,953,085 A | 8/1990 | Atkins | |
| D310,386 S | 9/1990 | Michels et al. | |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,978,401 A | 12/1990 | Bonomi | |
| 4,992,940 A | 2/1991 | Dworkin | |
| 5,025,139 A | 6/1991 | Halliburton, Jr. | |
| 5,025,372 A | 6/1991 | Burton | |
| 5,049,728 A | 9/1991 | Rovin | |
| 5,055,662 A | 10/1991 | Hasewaga | |
| 5,080,748 A | 1/1992 | Bonomi | |
| 5,095,194 A | 3/1992 | Barbanell | |
| 5,117,355 A | 5/1992 | McCarthy | |
| 5,146,068 A | 9/1992 | Ugawa et al. | |
| 5,163,098 A | 11/1992 | Dahbura | |
| 5,175,416 A | 12/1992 | Mansvelt | |
| 5,180,901 A | 1/1993 | Hiramatsu | |
| 5,185,697 A | 2/1993 | Jacobs et al. | |
| 5,192,947 A | 3/1993 | Neustein | |
| 5,202,286 A | 4/1993 | Nakatani | |
| 5,202,826 A | 4/1993 | McCarthy | |
| 5,206,488 A | 4/1993 | Teicher | |
| 5,206,803 A | 4/1993 | Vitagliano | |
| 5,214,700 A | 5/1993 | Pinkas et al. | |
| 5,218,631 A | 6/1993 | Katz | |
| 5,247,190 A | 9/1993 | Friend et al. | |
| 5,276,311 A | 1/1994 | Hennige | |
| 5,287,268 A | 2/1994 | McCarthy | |
| 5,287,269 A | 2/1994 | Dorrough | |
| 5,297,026 A | 3/1994 | Hoffman | |
| 5,305,196 A | 4/1994 | Deaton et al. | |
| 5,311,594 A | 5/1994 | Penzias | |
| 5,321,241 A | 6/1994 | Craine | |
| 5,326,959 A | 7/1994 | Perazza | |
| 5,326,960 A | 7/1994 | Tannenbaum | |
| 5,327,508 A | 7/1994 | Deaton et al. | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,359,183 A | 10/1994 | Skodlar | |
| 5,361,062 A | 11/1994 | Weiss et al. | |
| 5,365,575 A | 11/1994 | Katz | |
| 5,380,046 A | 1/1995 | Stephens | |
| 5,383,113 A | 1/1995 | Knight | |
| 5,383,687 A | 1/1995 | Suess et al. | |
| 5,397,881 A | 3/1995 | Mannik | |
| 5,399,502 A | 3/1995 | Friend et al. | |
| 5,401,827 A | 3/1995 | Holmes et al. | |
| RE34,915 E | 4/1995 | Nichtberger et al. | |
| 5,409,092 A | 4/1995 | Itako et al. | |
| 5,412,192 A | 5/1995 | Hoss | |
| 5,413,341 A | 5/1995 | Lieberman | |
| 5,424,524 A | 6/1995 | Ruppert | |
| 5,432,326 A | 7/1995 | Noblett et al. | |
| 5,440,108 A | 8/1995 | Tran et al. | |
| 5,450,477 A | 9/1995 | Amarant | |
| 5,450,491 A | 9/1995 | McNair | |
| 5,453,601 A | 9/1995 | Rosen | |
| 5,455,407 A | 10/1995 | Rosen | |
| 5,459,306 A | 10/1995 | Stein | |
| 5,465,206 A | 11/1995 | Hilt | |
| 5,466,919 A | 11/1995 | Hovakimian | |
| 5,466,920 A | 11/1995 | Nair et al. | |
| 5,471,669 A | 11/1995 | Lidman | |
| 5,477,038 A | 12/1995 | Levine | |
| 5,477,040 A | 12/1995 | Lalonde | |
| 5,479,494 A | 12/1995 | Clitherow | |
| 5,481,094 A | 1/1996 | Suda | |
| 5,482,139 A | 1/1996 | Rivalto | |
| 5,483,444 A | 1/1996 | Heintzman | |
| 5,483,445 A | 1/1996 | Pickering | |
| 5,489,123 A | 2/1996 | Roshkoff | |
| 5,500,514 A | 3/1996 | Veeneman | |
| 5,511,114 A | 4/1996 | Stimson | |
| 5,512,654 A | 4/1996 | Holmes et al. | |
| 5,513,102 A | 4/1996 | Auriemma | |
| 5,521,363 A | 5/1996 | Tannenbaum | |
| 5,530,232 A | 6/1996 | Taylor | |
| 5,530,235 A | 6/1996 | Stekfik | |
| 5,537,314 A | 7/1996 | Kanter | |
| 5,544,086 A | 8/1996 | Davis | |
| 5,544,246 A | 8/1996 | Mandelbaum | |
| 5,546,446 A | 8/1996 | Tsunokawa et al. | |
| 5,557,092 A | 9/1996 | Ackley et al. | |
| 5,557,516 A | 9/1996 | Hogan | |
| 5,563,934 A | 10/1996 | Eda | |
| 5,577,109 A | 11/1996 | Stimson | |
| 5,987,343 A | 11/1996 | Libman | |

| | | | | | | |
|---|---|---|---|---|---|---|
| 5,581,064 A | 12/1996 | Riley et al. | 5,777,903 A | 7/1998 | Piosenka et al. | |
| 5,583,933 A | 12/1996 | Mark | 5,778,067 A | 7/1998 | Jones et al. | |
| 5,585,787 A | 12/1996 | Wallerstein | 5,787,156 A | 7/1998 | Katz | |
| 5,590,038 A | 12/1996 | Pitroda | 5,787,404 A | 7/1998 | Fernandez-Holmann | |
| 5,592,560 A | 1/1997 | Deaton et al. | 5,789,733 A | 8/1998 | Jachimowicz et al. | |
| 5,604,542 A | 2/1997 | Dedrick | 5,794,207 A | 8/1998 | Walker et al. | |
| 5,608,785 A | 3/1997 | Kasday | 5,799,087 A | 8/1998 | Rosen | |
| 5,612,868 A | 3/1997 | Off | 5,802,176 A | 9/1998 | Audebert | |
| 5,621,201 A | 4/1997 | Langhans et al. | 5,805,719 A | 9/1998 | Pare et al. | |
| 5,621,787 A | 4/1997 | Mckoy | 5,806,042 A | 9/1998 | Kelly | |
| 5,621,812 A | 4/1997 | Deaton et al. | 5,806,044 A | 9/1998 | Powell | |
| 5,637,845 A | 6/1997 | Kolls | 5,806,045 A | 9/1998 | Biorge | |
| 5,638,457 A | 6/1997 | Deaton et al. | 5,807,627 A | 9/1998 | Friend et al. | |
| 5,642,279 A | 6/1997 | Stone | 5,809,478 A | 9/1998 | Greco | |
| 5,642,485 A | 6/1997 | Deaton et al. | 5,815,657 A | 9/1998 | Williams et al. | |
| 5,644,723 A | 7/1997 | Deaton et al. | 5,815,658 A | 9/1998 | Kuriyama | |
| 5,644,727 A | 7/1997 | Atkins | 5,819,234 A | 10/1998 | Slavin et al. | |
| 5,649,114 A | 7/1997 | Deaton et al. | 5,819,237 A | 10/1998 | Garman | |
| 5,649,117 A | 7/1997 | Landry | 5,825,871 A | 10/1998 | Mark | |
| 5,649,118 A | 7/1997 | Carlisle | 5,832,457 A | 11/1998 | O'Brien | |
| 5,650,604 A | 7/1997 | Marcous et al. | 5,832,488 A | 11/1998 | Eberhardt | |
| 5,653,914 A | 8/1997 | Holmes et al. | 5,835,061 A | 11/1998 | Stewart | |
| 5,659,741 A | 8/1997 | Eberhardt | 5,835,576 A | 11/1998 | Katz | |
| 5,664,110 A | 9/1997 | Green | 5,839,113 A | 11/1998 | Federau et al. | |
| 5,664,157 A | 9/1997 | Takahira et al. | 5,845,259 A | 12/1998 | West | |
| 5,665,953 A | 9/1997 | Mazzamuto | 5,845,260 A | 12/1998 | Nakano et al. | |
| 5,672,678 A | 9/1997 | Holmes et al. | 5,852,811 A | 12/1998 | Atkins | |
| 5,675,607 A | 10/1997 | Alesio | 5,852,812 A | 12/1998 | Reeder | |
| 5,675,662 A | 10/1997 | Deaton et al. | 5,857,079 A | 1/1999 | Claus | |
| 5,677,955 A | 10/1997 | Doggett | 5,857,175 A | 1/1999 | Day | |
| 5,684,291 A | 11/1997 | Taskett | 5,857,709 A | 1/1999 | Chock | |
| 5,687,322 A | 11/1997 | Deaton et al. | 5,859,419 A | 1/1999 | Wynn | |
| 5,689,100 A | 11/1997 | Carrithers | 5,864,609 A | 1/1999 | Cross | |
| 5,689,650 A | 11/1997 | McClelland | 5,864,828 A | 1/1999 | Atkins | |
| 5,692,132 A | 11/1997 | Hogan | 5,864,830 A * | 1/1999 | Armetta et al. | 705/41 |
| 5,696,907 A | 12/1997 | Tom | RE36,116 E | 2/1999 | McCarthy | |
| 5,699,528 A | 12/1997 | Hogan | 5,870,718 A | 2/1999 | Spector | |
| 5,703,344 A | 12/1997 | Bezy | 5,870,721 A | 2/1999 | Norris | |
| 5,704,046 A | 12/1997 | Hogan | 5,875,437 A | 2/1999 | Atkins | |
| 5,705,798 A | 1/1998 | Tarbox | 5,877,975 A | 3/1999 | Jigour et al. | |
| 5,708,422 A | 1/1998 | Blonder | 5,883,377 A | 3/1999 | Chapin, Jr. | |
| 5,710,458 A | 1/1998 | Iwasaki | 5,883,810 A | 3/1999 | Franklin | |
| 5,710,886 A | 1/1998 | Christensen | 5,884,271 A | 3/1999 | Pitroda | |
| 5,710,887 A | 1/1998 | Chelliah | 5,884,278 A | 3/1999 | Powell | |
| 5,710,889 A | 1/1998 | Clark et al. | 5,884,285 A | 3/1999 | Atkins | |
| 5,715,399 A | 2/1998 | Bezos | 5,887,065 A | 3/1999 | Audebert | |
| 5,717,925 A | 2/1998 | Harper et al. | 5,890,138 A | 3/1999 | Godin et al. | |
| 5,721,768 A | 2/1998 | Stimson | 5,890,140 A | 3/1999 | Clark et al. | |
| 5,721,781 A | 2/1998 | Deo et al. | H001794 H | 4/1999 | Claus | |
| 5,726,884 A | 3/1998 | Sturgeon et al. | H1794 H | 4/1999 | Claus | |
| 5,727,153 A | 3/1998 | Powell | D408,054 S | 4/1999 | Leedy, Jr. | |
| 5,728,998 A | 3/1998 | Novis et al. | 5,897,620 A | 4/1999 | Walker et al. | |
| 5,729,693 A | 3/1998 | Holda-Fleck | 5,897,621 A | 4/1999 | Boesch et al. | |
| 5,732,136 A | 3/1998 | Murphree et al. | 5,901,303 A | 5/1999 | Chew | |
| 5,734,154 A | 3/1998 | Jachimowicz et al. | 5,903,879 A | 5/1999 | Mitchell | |
| 5,734,838 A | 3/1998 | Robinson | 5,905,246 A | 5/1999 | Fajkowski | |
| 5,736,728 A | 4/1998 | Matsubara | 5,907,350 A | 5/1999 | Nemirofsky | |
| 5,740,549 A | 4/1998 | Reilly et al. | 5,911,135 A | 6/1999 | Atkins | |
| 5,742,775 A | 4/1998 | King | 5,911,136 A | 6/1999 | Atkins | |
| 5,744,787 A | 4/1998 | Teicher | 5,914,472 A | 6/1999 | Foladare et al. | |
| 5,745,049 A | 4/1998 | Akiyama et al. | 5,920,629 A | 7/1999 | Rosen | |
| 5,745,555 A | 4/1998 | Mark | 5,920,844 A | 7/1999 | Hotta et al. | |
| 5,745,706 A | 4/1998 | Wolfberg et al. | 5,920,847 A | 7/1999 | Kolling et al. | |
| 5,748,737 A | 5/1998 | Daggar | 5,923,734 A | 7/1999 | Taskett | |
| 5,749,075 A | 5/1998 | Toader et al. | 5,926,792 A | 7/1999 | Koppes et al. | |
| 5,760,381 A | 6/1998 | Stich | 5,926,800 A | 7/1999 | Baronowski et al. | |
| 5,765,138 A | 6/1998 | Aycock et al. | 5,928,082 A | 7/1999 | Clapper, Jr. | |
| 5,765,141 A | 6/1998 | Spector | 5,930,217 A | 7/1999 | Kayanuma | |
| 5,770,843 A | 6/1998 | Rose | 5,931,764 A | 8/1999 | Freeman et al. | |
| 5,770,849 A | 6/1998 | Novis et al. | 5,933,817 A | 8/1999 | Hucal | |
| 5,774,870 A | 6/1998 | Storey | 5,936,221 A | 8/1999 | Corder et al. | |
| 5,777,305 A | 7/1998 | Smith | 5,937,068 A | 8/1999 | Audebert | |
| 5,777,306 A | 7/1998 | Masuda | 5,940,811 A * | 8/1999 | Norris | 705/38 |

| | | | | | | |
|---|---|---|---|---|---|---|
| 5,952,641 | A | 9/1999 | Korshun | 6,105,009 | A | 8/2000 | Cuervo |
| 5,953,423 | A | 9/1999 | Rosen | 6,105,011 | A | 8/2000 | Morrison, Jr. |
| 5,953,710 | A | 9/1999 | Fleming | 6,105,865 | A | 8/2000 | Hardesty |
| 5,955,961 | A | 9/1999 | Wallerstein | 6,115,458 | A | 9/2000 | Taskett |
| 5,963,648 | A | 10/1999 | Rosen | 6,119,932 | A | 9/2000 | Maloney et al. |
| 5,970,469 | A | 10/1999 | Scroggie et al. | 6,122,623 | A | 9/2000 | Garman |
| 5,970,479 | A | 10/1999 | Shepherd | 6,128,598 | A | 10/2000 | Walker et al. |
| 5,970,480 | A | 10/1999 | Kalina | 6,128,599 | A | 10/2000 | Walker et al. |
| 5,974,399 | A | 10/1999 | Giuliani et al. | 6,129,274 | A | 10/2000 | Suzuki |
| RE36,365 | E | 11/1999 | Levine et al. | 6,129,572 | A | 10/2000 | Feldman et al. |
| 5,984,180 | A | 11/1999 | Albrecht | 6,134,309 | A | 10/2000 | Carson |
| 5,984,191 | A | 11/1999 | Chapin, Jr. | 6,134,536 | A | 10/2000 | Shepherd |
| 5,987,434 | A | 11/1999 | Libman | 6,138,911 | A | 10/2000 | Fredregill et al. |
| 5,988,509 | A | 11/1999 | Taskett | 6,138,917 | A | 10/2000 | Chapin, Jr. |
| 5,991,413 | A | 11/1999 | Arditti et al. | 6,142,640 | A | 11/2000 | Schofield |
| 5,991,743 | A | 11/1999 | Irving et al. | 6,145,741 | A | 11/2000 | Wisdom et al. |
| 5,991,748 | A | 11/1999 | Taskett | 6,148,297 | A | 11/2000 | Swor et al. |
| 5,991,750 | A | 11/1999 | Watson | 6,161,096 | A | 12/2000 | Bell |
| 5,999,596 | A | 12/1999 | Walker et al. | 6,163,770 | A | 12/2000 | Gamble et al. |
| 5,999,624 | A | 12/1999 | Hopkins | 6,163,771 | A | 12/2000 | Walker et al. |
| 5,999,917 | A | 12/1999 | Facciani et al. | 6,164,533 | A | 12/2000 | Barton |
| 6,000,608 | A | 12/1999 | Dorf | 6,167,385 | A | 12/2000 | Hartley Urquhart |
| 6,000,832 | A | 12/1999 | Franklin et al. | 6,169,975 | B1 | 1/2001 | White et al. |
| 6,002,383 | A | 12/1999 | Shimada | 6,173,267 | B1 | 1/2001 | Cairns |
| 6,003,762 | A | 12/1999 | Hayashida | 6,179,211 | B1 | 1/2001 | Green et al. |
| 6,004,681 | A | 12/1999 | Epstein et al. | 6,182,048 | B1 | 1/2001 | Osborn et al. |
| 6,006,988 | A | 12/1999 | Behrmann et al. | 6,182,059 | B1 | 1/2001 | Angotti et al. |
| 6,009,415 | A | 12/1999 | Shurling et al. | D437,882 | S | 2/2001 | Creighton |
| 6,014,634 | A | 1/2000 | Scroggie et al. | 6,182,894 | B1 | 2/2001 | Hackett et al. |
| 6,014,636 | A | 1/2000 | Reeder | 6,185,541 | B1 | 2/2001 | Scroggie et al. |
| 6,014,638 | A | 1/2000 | Burge et al. | 6,186,793 | B1 | 2/2001 | Brubaker |
| 6,014,645 | A | 1/2000 | Cunningham | 6,189,787 | B1 | 2/2001 | Dorf |
| 6,014,749 | A | 1/2000 | Gloor et al. | 6,192,142 | B1 | 2/2001 | Pare, Jr. et al. |
| 6,016,482 | A | 1/2000 | Molinari et al. | 6,195,644 | B1 | 2/2001 | Bowie |
| 6,016,954 | A | 1/2000 | Abe et al. | 6,202,053 | B1 | 3/2001 | Christiansen et al. |
| 6,019,284 | A | 2/2000 | Freeman et al. | RE37,122 | E | 4/2001 | Levine et al. |
| 6,021,189 | A | 2/2000 | Vu | D442,627 | S | 5/2001 | Webb et al. |
| 6,026,370 | A | 2/2000 | Jermyn | 6,227,445 | B1 | 5/2001 | Brookner |
| 6,029,139 | A | 2/2000 | Cunningham et al. | 6,227,447 | B1 | 5/2001 | Campisano |
| 6,029,144 | A | 2/2000 | Barrett et al. | 6,227,972 | B1 | 5/2001 | Walker et al. |
| 6,029,890 | A | 2/2000 | Austin | 6,243,688 | B1 | 6/2001 | Kalina |
| 6,032,136 | A | 2/2000 | Brake, Jr. et al. | 6,263,316 | B1 | 7/2001 | Khan et al. |
| 6,038,292 | A | 3/2000 | Thomas | 6,265,977 | B1 | 7/2001 | Vega et al. |
| 6,038,552 | A | 3/2000 | Fleischl et al. | 6,278,981 | B1 | 8/2001 | Dembo et al. |
| 6,041,315 | A | 3/2000 | Pollin | 6,278,996 | B1 | 8/2001 | Richardson et al. |
| 6,045,042 | A | 4/2000 | Ohno | 6,282,516 | B1 | 8/2001 | Giuliani |
| 6,045,050 | A | 4/2000 | Ippolito et al. | 6,282,522 | B1 | 8/2001 | Davis et al. |
| 6,047,067 | A | 4/2000 | Rosen | 6,295,522 | B1 | 9/2001 | Boesch |
| 6,047,268 | A | 4/2000 | Bartoli et al. | D449,336 | S | 10/2001 | Webb et al. |
| 6,048,271 | A | 4/2000 | Barcelou | 6,298,336 | B1 | 10/2001 | Davis et al. |
| 6,049,463 | A | 4/2000 | O'Malley et al. | 6,308,268 | B1 | 10/2001 | Audebert |
| 6,049,773 | A | 4/2000 | McCormack et al. | 6,315,193 | B1 | 11/2001 | Hogan |
| 6,049,782 | A | 4/2000 | Gottesman et al. | 6,315,195 | B1 | 11/2001 | Ramachandran |
| 6,058,378 | A | 5/2000 | Clark et al. | 6,336,099 | B1 | 1/2002 | Barnett et al. |
| 6,061,660 | A | 5/2000 | Eggleston et al. | 6,341,724 | B2 | 1/2002 | Campisano |
| 6,064,985 | A | 5/2000 | Anderson | 6,343,743 | B1 | 2/2002 | Lamla |
| 6,065,675 | A | 5/2000 | Teicher | 6,344,108 | B1 | 2/2002 | Von Medvey et al. |
| 6,068,183 | A | 5/2000 | Freeman et al. | 6,345,261 | B1 | 2/2002 | Feidelson et al. |
| 6,070,067 | A | 5/2000 | Nguyen et al. | 6,345,766 | B1 | 2/2002 | Taskett |
| 6,070,147 | A | 5/2000 | Harms et al. | 6,349,291 | B1 | 2/2002 | Varma |
| 6,070,153 | A | 5/2000 | Simpson | 6,349,972 | B1 | 2/2002 | Geiger et al. |
| D427,167 | S | 6/2000 | Iwasaki | 6,351,735 | B1 | 2/2002 | Deaton et al. |
| 6,076,068 | A | 6/2000 | DeLapa et al. | 6,360,954 | B1 | 3/2002 | Barnardo |
| 6,076,072 | A | 6/2000 | Libman | 6,366,220 | B1 | 4/2002 | Elliott |
| 6,078,888 | A | 6/2000 | Johnson, Jr. | 6,366,967 | B1 | 4/2002 | Wagner |
| 6,078,891 | A | 6/2000 | Riordan et al. | 6,373,969 | B1 | 4/2002 | Adler |
| 6,091,817 | A | 7/2000 | Bertina et al. | 6,377,669 | B1 | 4/2002 | Walker et al. |
| 6,092,056 | A | 7/2000 | Tull, Jr. et al. | 6,377,935 | B1 | 4/2002 | Deaton et al. |
| 6,095,412 | A | 8/2000 | Bertina et al. | 6,382,677 | B1 | 5/2002 | Kaule et al. |
| 6,095,416 | A | 8/2000 | Grant et al. | 6,385,591 | B1 | 5/2002 | Mankoff |
| 6,098,053 | A | 8/2000 | Slater | 6,385,594 | B1 | 5/2002 | Lebda et al. |
| 6,105,006 | A | 8/2000 | Davis et al. | 6,386,444 | B1 | 5/2002 | Sullivan |
| 6,105,008 | A | 8/2000 | Davis et al. | 6,397,202 | B1 | 5/2002 | Higgins et al. |

| Patent No. | Date | Name |
|---|---|---|
| 6,402,039 B1 | 6/2002 | Freeman et al. |
| 6,405,182 B1 | 6/2002 | Cuervo |
| 6,409,593 B1 | 6/2002 | Petrecca |
| 6,411,939 B1 | 6/2002 | Parsons |
| 6,411,947 B1 | 6/2002 | Rice et al. |
| 6,419,161 B1 | 7/2002 | Haddad et al. |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid |
| 6,446,210 B1 | 9/2002 | Borza |
| 6,450,407 B1 | 9/2002 | Freeman et al. |
| 6,454,647 B1 | 9/2002 | Woodbury, Jr. |
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,488,206 B1 | 12/2002 | Flaig et al. |
| 6,491,782 B1 | 12/2002 | Jaynes |
| 6,498,861 B1 | 12/2002 | Hamid |
| 6,505,095 B1 | 1/2003 | Kolls |
| 6,505,168 B1 | 1/2003 | Rothman et al. |
| 6,507,644 B1 | 1/2003 | Henderson et al. |
| 6,558,255 B2 | 5/2003 | Walker et al. |
| 6,560,578 B2 | 5/2003 | Eldering |
| 6,561,657 B1 | 5/2003 | Schofield |
| 6,567,786 B2 | 5/2003 | Bibelnieks et al. |
| 6,567,821 B1 | 5/2003 | Polk |
| 6,574,603 B1 | 6/2003 | Dickson et al. |
| 6,575,361 B1 | 6/2003 | Graves et al. |
| 6,581,839 B1 | 6/2003 | Lasch et al. |
| 6,581,845 B2 | 6/2003 | Ye |
| D477,359 S | 7/2003 | Haas |
| 6,592,044 B1 | 7/2003 | Wong et al. |
| 6,594,640 B1 | 7/2003 | Postrel |
| 6,601,040 B1 | 7/2003 | Kolls |
| 6,601,761 B1 | 8/2003 | Katis |
| 6,609,111 B1 | 8/2003 | Bell |
| 6,609,113 B1 | 8/2003 | O'Leary et al. |
| 6,609,654 B1 | 8/2003 | Anderson et al. |
| 6,609,658 B1 | 8/2003 | Sehr |
| 6,611,910 B2 | 8/2003 | Mittal et al. |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,647,374 B2 | 11/2003 | Kansal |
| 6,655,587 B2 | 12/2003 | Andrews et al. |
| 6,655,598 B1 | 12/2003 | Curiel |
| 6,659,259 B2 | 12/2003 | Knox et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,693,544 B1 | 2/2004 | Hebbecker |
| 6,705,518 B2 | 3/2004 | Park et al. |
| 6,727,802 B2 | 4/2004 | Kelly et al. |
| 6,732,919 B2 | 5/2004 | Macklin et al. |
| 6,742,125 B1 | 5/2004 | Gabber et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D493,195 S | 7/2004 | Creighton |
| 6,764,014 B2 | 7/2004 | Lasch et al. |
| D495,736 S | 9/2004 | Scharf |
| 6,793,131 B2 | 9/2004 | Hogan |
| 6,793,135 B2 | 9/2004 | Ryoo |
| 6,802,008 B1 | 10/2004 | Ikefuji et al. |
| 6,805,287 B2 | 10/2004 | Bishop |
| 6,805,288 B2 | 10/2004 | Routhenstein et al. |
| 6,805,289 B2 | 10/2004 | Noriega et al. |
| 6,814,282 B2 | 11/2004 | Seifert et al. |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| 6,865,547 B1 | 3/2005 | Brake, Jr. et al. |
| 6,868,426 B1 | 3/2005 | Mankoff |
| 6,876,971 B1 | 4/2005 | Burke |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,886,741 B1 | 5/2005 | Salveson |
| 6,892,187 B2 | 5/2005 | Phillips et al. |
| 6,901,372 B1 | 5/2005 | Helzerman |
| 6,913,193 B1 | 7/2005 | Kawan |
| 6,924,026 B2 | 8/2005 | Jaynes |
| 6,931,382 B2 | 8/2005 | Laage et al. |
| 6,942,156 B2 | 9/2005 | Ohta et al. |
| 6,942,569 B2 | 9/2005 | Petrecca |
| 6,945,453 B1 | 9/2005 | Schwarz Jr. |
| 6,947,898 B2 | 9/2005 | Postrel |
| 6,954,741 B1 | 10/2005 | Burchetta et al. |
| 6,961,710 B1 | 11/2005 | Yanagisawa et al. |
| 6,999,569 B2 | 2/2006 | Risafi et al. |
| 6,999,943 B1 | 2/2006 | Johnson et al. |
| 7,006,992 B1 | 2/2006 | Packwood |
| 7,014,110 B2 | 3/2006 | Minowa et al. |
| 7,024,374 B1 | 4/2006 | Day et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,929 B2 | 5/2006 | Li |
| 7,054,842 B2 | 5/2006 | James et al. |
| 7,070,095 B1 | 7/2006 | Gandel et al. |
| 7,082,416 B2 | 7/2006 | Anderson |
| 7,083,084 B2 | 8/2006 | Graves et al. |
| 7,086,586 B1 | 8/2006 | Sullivan |
| 7,092,916 B2 | 8/2006 | Diveley |
| 7,107,249 B2 | 9/2006 | Dively |
| D530,741 S | 10/2006 | Blossom |
| 7,120,601 B2 | 10/2006 | Chen et al. |
| 7,128,272 B2 | 10/2006 | Doublet |
| 7,130,828 B2 | 10/2006 | Phillips et al. |
| D533,220 S | 12/2006 | Graves et al. |
| 7,156,301 B1 | 1/2007 | Bonalle et al. |
| 7,163,153 B2 | 1/2007 | Blossom |
| 7,167,844 B1 | 1/2007 | Leong et al. |
| 7,171,388 B1 | 1/2007 | Phillips et al. |
| 7,174,314 B2 | 2/2007 | Phillips et al. |
| 7,174,315 B2 | 2/2007 | Phillips et al. |
| 7,174,316 B2 | 2/2007 | Phillips et al. |
| 7,174,317 B2 | 2/2007 | Phillips et al. |
| 7,177,838 B1 | 2/2007 | Ling |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein et al. |
| 7,216,091 B1 | 5/2007 | Blandina et al. |
| 7,216,099 B2 | 5/2007 | Chen et al. |
| 7,225,155 B1 | 5/2007 | Polk |
| 7,239,226 B2 | 7/2007 | Berardi et al. |
| 7,243,839 B2 | 7/2007 | Beck et al. |
| 7,249,092 B2 | 7/2007 | Dunn et al. |

| | | |
|---|---|---|
| 7,249,099 B2 | 7/2007 | Ling |
| 7,252,223 B2 | 8/2007 | Schofield |
| 7,252,226 B2 | 8/2007 | Risafi et al. |
| 7,254,560 B2 | 8/2007 | Singhal |
| 7,263,507 B1 | 8/2007 | Brake, Jr. |
| D551,705 S | 9/2007 | Mershon |
| 7,275,160 B2 | 9/2007 | Pearson et al. |
| 7,295,999 B1 | 11/2007 | Simon et al. |
| 7,310,617 B1 | 12/2007 | Cunningham |
| 7,313,546 B2 | 12/2007 | Alarcon-Luther |
| 7,315,843 B2 | 1/2008 | Diveley et al. |
| D562,888 S | 2/2008 | Brown |
| 7,328,181 B2 | 2/2008 | Sutton et al. |
| 7,328,189 B2 | 2/2008 | Ling |
| 7,346,567 B2 | 3/2008 | Weeks |
| 7,357,331 B2 | 4/2008 | Blossom |
| 7,359,880 B2 | 4/2008 | Abel et al. |
| 7,363,273 B2 | 4/2008 | Phillips et al. |
| 7,376,621 B1 | 5/2008 | Ling |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,398,248 B2 | 7/2008 | Phillips et al. |
| 7,401,049 B2 | 7/2008 | Hobbs et al. |
| D576,671 S | 9/2008 | Field et al. |
| 7,461,028 B2 | 12/2008 | Wronski, Jr. |
| 7,502,758 B2 | 3/2009 | Burke |
| 7,503,503 B2 | 3/2009 | Riedl et al. |
| 7,506,806 B2 | 3/2009 | Bonalle et al. |
| D602,522 S | 10/2009 | Field et al. |
| D602,986 S | 10/2009 | Skelding et al. |
| 7,606,730 B2 | 10/2009 | Antonucci |
| 7,660,763 B1 | 2/2010 | Brake, Jr. et al. |
| 7,676,425 B1 | 3/2010 | Noles |
| 7,707,111 B2 | 4/2010 | Brake, Jr. et al. |
| 2001/0001856 A1 | 5/2001 | Gould et al. |
| 2001/0002487 A1 | 5/2001 | Grawrock et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0032312 A1 | 10/2001 | Runje et al. |
| 2001/0034647 A1 | 10/2001 | Marks et al. |
| 2001/0034682 A1 | 10/2001 | Knight et al. |
| 2001/0034684 A1 | 10/2001 | Cushing et al. |
| 2001/0037276 A1 | 11/2001 | Kelly et al. |
| 2001/0037315 A1 | 11/2001 | Saliba et al. |
| 2001/0044293 A1 | 11/2001 | Morgan |
| 2001/0044733 A1 | 11/2001 | Lee et al. |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0010591 A1 | 1/2002 | Pomerance |
| 2002/0013751 A1 | 1/2002 | Facciani et al. |
| 2002/0019793 A1 | 2/2002 | Frattalone |
| 2002/0019803 A1 | 2/2002 | Muller |
| 2002/0026416 A1 | 2/2002 | Provinse |
| 2002/0026418 A1 | 2/2002 | Koppel et al. |
| 2002/0035527 A1 | 3/2002 | Corrin |
| 2002/0046255 A1 | 4/2002 | Moore et al. |
| 2002/0062235 A1 | 5/2002 | Wahlbin et al. |
| 2002/0062249 A1 | 5/2002 | Iannacci |
| 2002/0062279 A1 | 5/2002 | Behrenbrinker et al. |
| 2002/0065712 A1 | 5/2002 | Kawan |
| 2002/0065720 A1 | 5/2002 | Carswell et al. |
| 2002/0069122 A1 | 6/2002 | Yun et al. |
| 2002/0073030 A1 | 6/2002 | Offer |
| 2002/0077978 A1 | 6/2002 | Oleary et al. |
| 2002/0091572 A1 | 7/2002 | Anderson et al. |
| 2002/0091632 A1 | 7/2002 | Turock et al. |
| 2002/0091649 A1 | 7/2002 | Anvekar et al. |
| 2002/0095365 A1 | 7/2002 | Slavin |
| 2002/0099667 A1 | 7/2002 | Diamandis et al. |
| 2002/0111886 A1 | 8/2002 | Chenevich et al. |
| 2002/0116271 A1 | 8/2002 | Mankoff |
| 2002/0116330 A1 | 8/2002 | Hed et al. |
| 2002/0117541 A1* | 8/2002 | Biggar et al. ............... 235/379 |
| 2002/0120627 A1 | 8/2002 | Mankoff |
| 2002/0120642 A1 | 8/2002 | Fetherston |
| 2002/0139843 A1 | 10/2002 | Park et al. |
| 2002/0145039 A1 | 10/2002 | Carroll |
| 2002/0147662 A1 | 10/2002 | Anderson |
| 2002/0147683 A1 | 10/2002 | Capobianco et al. |
| 2002/0152168 A1 | 10/2002 | Neofytides et al. |
| 2002/0161699 A1 | 10/2002 | Okamoto et al. |
| 2002/0161702 A1 | 10/2002 | Milberger et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0174030 A1 | 11/2002 | Praisner et al. |
| 2002/0178025 A1 | 11/2002 | Hansen et al. |
| 2002/0178063 A1 | 11/2002 | Gravelle et al. |
| 2002/0190123 A1 | 12/2002 | Anvekar et al. |
| 2002/0194098 A1 | 12/2002 | Stiff et al. |
| 2002/0194124 A1 | 12/2002 | Hobbs et al. |
| 2002/0198848 A1 | 12/2002 | Michener |
| 2003/0001005 A1 | 1/2003 | Risafi et al. |
| 2003/0004828 A1 | 1/2003 | Epstein |
| 2003/0010831 A1 | 1/2003 | Ye |
| 2003/0014004 A1 | 1/2003 | Dey |
| 2003/0023549 A1 | 1/2003 | Armes et al. |
| 2003/0028518 A1 | 2/2003 | Mankoff |
| 2003/0031321 A1 | 2/2003 | Mages |
| 2003/0033211 A1 | 2/2003 | Haines et al. |
| 2003/0033246 A1 | 2/2003 | Slater |
| 2003/0034388 A1 | 2/2003 | Routhenstein et al. |
| 2003/0040927 A1 | 2/2003 | Sato et al. |
| 2003/0046249 A1 | 3/2003 | Wu |
| 2003/0046542 A1 | 3/2003 | Chen et al. |
| 2003/0053609 A1 | 3/2003 | Risafi et al. |
| 2003/0055780 A1 | 3/2003 | Hansen et al. |
| 2003/0055782 A1 | 3/2003 | Slater |
| 2003/0061168 A1 | 3/2003 | Routhenstein et al. |
| 2003/0065624 A1 | 4/2003 | James et al. |
| 2003/0074290 A1 | 4/2003 | Clore |
| 2003/0078815 A1 | 4/2003 | Parsons |
| 2003/0085272 A1 | 5/2003 | Andrews et al. |
| 2003/0085286 A1 | 5/2003 | Kelley et al. |
| 2003/0101119 A1 | 5/2003 | Persons et al. |
| 2003/0105672 A1 | 6/2003 | Epstein et al. |
| 2003/0105714 A1 | 6/2003 | Alarcon-Luther |
| 2003/0120571 A1 | 6/2003 | Blagg |
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0149660 A1 | 8/2003 | Canfield |
| 2003/0154125 A1 | 8/2003 | Mittal et al. |
| 2003/0154163 A1 | 8/2003 | Phillips et al. |
| 2003/0163403 A1 | 8/2003 | Chen et al. |
| 2003/0163416 A1 | 8/2003 | Kitajima |
| 2003/0167218 A1 | 9/2003 | Field et al. |
| 2003/0167220 A1 | 9/2003 | Schoen et al. |
| 2003/0172040 A1 | 9/2003 | Kemper et al. |
| 2003/0182218 A1 | 9/2003 | Blagg |
| 2003/0182246 A1 | 9/2003 | Johnson et al. |
| 2003/0195808 A1 | 10/2003 | Brown et al. |
| 2003/0195842 A1 | 10/2003 | Reece |
| 2003/0200143 A9 | 10/2003 | Walker et al. |
| 2003/0200179 A1 | 10/2003 | Kwan |
| 2003/0200180 A1 | 10/2003 | Phelan et al. |
| 2003/0205616 A1 | 11/2003 | Graves et al. |

| | | |
|---|---|---|
| 2003/0213843 A1 | 11/2003 | Jackson |
| 2003/0216965 A1 | 11/2003 | Libman |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0222136 A1 | 12/2003 | Bolle et al. |
| 2003/0225623 A1 | 12/2003 | Wankmueller |
| 2003/0236704 A1 | 12/2003 | Antonucci |
| 2004/0007618 A1 | 1/2004 | Oram et al. |
| 2004/0024672 A1 | 2/2004 | Brake, Jr. et al. |
| 2004/0024693 A1 | 2/2004 | Lawrence |
| 2004/0030626 A1 | 2/2004 | Libman |
| 2004/0039588 A1 | 2/2004 | Libman |
| 2004/0049452 A1 | 3/2004 | Blagg |
| 2004/0064332 A1 | 4/2004 | Zou et al. |
| 2004/0088236 A1 | 5/2004 | Manning |
| 2004/0088238 A1 | 5/2004 | Gilson et al. |
| 2004/0098351 A1 | 5/2004 | Duke |
| 2004/0103431 A1 | 5/2004 | Davenport et al. |
| 2004/0117202 A1 | 6/2004 | Winklevoss et al. |
| 2004/0118914 A1 | 6/2004 | Smith et al. |
| 2004/0122736 A1 | 6/2004 | Strock et al. |
| 2004/0128217 A1 | 7/2004 | Friedman et al. |
| 2004/0133787 A1 | 7/2004 | Doughty et al. |
| 2004/0158517 A1 | 8/2004 | Mahaney et al. |
| 2004/0172350 A1 | 9/2004 | Atkinson et al. |
| 2004/0210498 A1 | 10/2004 | Freund |
| 2004/0215507 A1 | 10/2004 | Levitt et al. |
| 2004/0242308 A1 | 12/2004 | Gray |
| 2004/0243498 A1 | 12/2004 | Duke |
| 2005/0021400 A1 | 1/2005 | Postrel |
| 2005/0027649 A1 | 2/2005 | Cech |
| 2005/0035192 A1 | 2/2005 | Bonalle et al. |
| 2005/0049950 A1 | 3/2005 | Johnson |
| 2005/0060260 A1 | 3/2005 | Masuda et al. |
| 2005/0065877 A1 | 3/2005 | Cleary et al. |
| 2005/0071230 A1 | 3/2005 | Mankoff |
| 2005/0075932 A1 | 4/2005 | Mankoff |
| 2005/0086160 A1 | 4/2005 | Wong |
| 2005/0091138 A1 | 4/2005 | Awatsu |
| 2005/0091492 A1 | 4/2005 | Benson et al. |
| 2005/0102228 A1 | 5/2005 | Srinivasan et al. |
| 2005/0108152 A1 | 5/2005 | Tsoa Lee et al. |
| 2005/0114883 A1 | 5/2005 | Nagai et al. |
| 2005/0127168 A1 | 6/2005 | Phillips et al. |
| 2005/0167488 A1 | 8/2005 | Higgins et al. |
| 2005/0171842 A1 | 8/2005 | Tien et al. |
| 2005/0171898 A1 | 8/2005 | Bishop et al. |
| 2005/0179251 A1 | 8/2005 | Wagoner et al. |
| 2005/0189427 A1 | 9/2005 | Brown et al. |
| 2005/0199705 A1 | 9/2005 | Beck et al. |
| 2005/0206499 A1 | 9/2005 | Fisher |
| 2005/0216888 A1 | 9/2005 | Drummond et al. |
| 2005/0234771 A1 | 10/2005 | Register et al. |
| 2005/0269396 A1 | 12/2005 | Schofield |
| 2005/0289044 A1 | 12/2005 | Breslin et al. |
| 2006/0020542 A1 | 1/2006 | Litle |
| 2006/0026092 A1 | 2/2006 | Klein et al. |
| 2006/0036543 A1 | 2/2006 | Blagg et al. |
| 2006/0039733 A1 | 2/2006 | Meyerhofer |
| 2006/0047573 A1 | 3/2006 | Mitchell et al. |
| 2006/0047589 A1 | 3/2006 | Grau |
| 2006/0116903 A1 | 6/2006 | Becerra |
| 2006/0116955 A1 | 6/2006 | Strayer et al. |
| 2006/0131869 A1 | 6/2006 | Brignull |
| 2006/0157557 A1 | 7/2006 | Lee et al. |
| 2006/0249574 A1 | 11/2006 | Brown et al. |
| 2006/0251478 A1 | 11/2006 | Desmeules |
| 2006/0261927 A1 | 11/2006 | Kelly et al. |
| 2006/0289636 A1 | 12/2006 | Hoblit |
| 2007/0020443 A1 | 1/2007 | Lo |
| 2007/0034700 A1 | 2/2007 | Poidomani et al. |
| 2007/0113451 A1 | 5/2007 | McDowell et al. |
| 2007/0118436 A1 | 5/2007 | McDowell et al. |
| 2007/0136211 A1 | 6/2007 | Brown et al. |
| 2007/0208671 A1 | 9/2007 | Brown et al. |
| 2007/0215688 A1 | 9/2007 | Routhenstein et al. |
| 2007/0226141 A1 | 9/2007 | Phillips et al. |
| 2008/0005018 A1 | 1/2008 | Powell |
| 2008/0021825 A1 | 1/2008 | Phillips et al. |
| 2008/0027841 A1 | 1/2008 | Eder |
| 2008/0029607 A1 | 2/2008 | Mullen |
| 2008/0035738 A1 | 2/2008 | Mullen |
| 2008/0054068 A1 | 3/2008 | Mullen |
| 2008/0054079 A1 | 3/2008 | Mullen |
| 2008/0054081 A1 | 3/2008 | Mullen |
| 2008/0059373 A1 | 3/2008 | Phillips et al. |
| 2008/0065555 A1 | 3/2008 | Mullen |
| 2008/0177659 A1 | 7/2008 | Lacey et al. |
| 2008/0187770 A1 | 8/2008 | Funicelli et al. |
| 2008/0230600 A1 | 9/2008 | Black et al. |
| 2008/0245865 A1 | 10/2008 | Mosteller |
| 2008/0301041 A1 | 12/2008 | Bruk |
| 2008/0302869 A1 | 12/2008 | Mullen |
| 2008/0302876 A1 | 12/2008 | Mullen |
| 2009/0048972 A1 | 2/2009 | Bierer et al. |
| 2009/0230195 A1 | 9/2009 | Lasch et al. |
| 2009/0240620 A1 | 9/2009 | Kendrick et al. |
| 2009/0242645 A1 | 10/2009 | Komatsu et al. |
| 2009/0250522 A1 | 10/2009 | Williams et al. |
| 2009/0261161 A1 | 10/2009 | Blossom |
| 2009/0265275 A1 | 10/2009 | Everhart |
| 2009/0271853 A1 | 10/2009 | Everhart |
| 2010/0030675 A1 | 2/2010 | Hanan et al. |
| 2010/0030697 A1 | 2/2010 | Goodrich et al. |

FOREIGN PATENT DOCUMENTS

| | | |
|---|---|---|
| DE | 19702532 | 3/1998 |
| DE | 102006015818 | 10/2007 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| JP | 53-118104 | 10/1978 |
| JP | 64-87397 | 3/1989 |
| JP | 3-114879 | 5/1991 |
| JP | 4-073193 | 3/1992 |
| JP | 4-201392 | 7/1992 |
| JP | 5-011676 | 1/1993 |
| JP | 8-080680 | 3/1996 |
| JP | 8-096098 | 4/1996 |
| JP | 10-116016 | 5/1998 |
| JP | 2000-113151 | 4/2000 |
| JP | 2002-259933 | 9/2002 |
| JP | 2002-366015 | 12/2002 |
| JP | 2005-246658 | 9/2005 |
| JP | 2008-015071 | 1/2008 |
| WO | WO 94/29112 | 12/1994 |
| WO | WO 97-20692 | 6/1997 |
| WO | WO 97/41673 | 11/1997 |
| WO | WO 98/10368 | 3/1998 |
| WO | WO 98/59307 | 12/1998 |
| WO | WO 99/05633 | 2/1999 |
| WO | WO 99/54841 | 10/1999 |
| WO | WO /159654 | 8/2001 |
| WO | WO 01/69347 | 9/2001 |
| WO | WO 01/69347 A2 | 9/2001 |
| WO | WO 01/69347 A3 | 9/2001 |
| WO | WO 01/88659 | 11/2001 |
| WO | WO 2005/043277 A2 | 5/2005 |
| WO | WO 2005-101975 | 11/2005 |
| WO | WO 2006-060370 | 6/2006 |
| WO | WO 2006-105092 | 10/2006 |
| WO | WO 2006/105092 | 10/2006 |

| | | |
|---|---|---|
| WO | WO 2006/116772 | 11/2006 |
| WO | WO 2006/116772 | 11/2006 |
| WO | WO 2007-115725 | 10/2007 |
| WO | WO 2009-023817 | 2/2009 |

OTHER PUBLICATIONS

Edwards, ATMs The Hot New Media Buy, ABA Banking Journal, Mar. 1999, pp. 58, 60.
Neumann, An Enhanced Neural Network Technique for Software Risk Analysis, IEEE Transactions on Software Engineering, vol. 28, No. 9, Sep. 1, 2002, pp. 904-912.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
Clark, Microsoft, Visa to Jointly Develop PC Electronic-Shopping Software, The Wall Street Journal, Nov. 9, 1994, WSJ B9.
Bogle, Mutual Funds at the Millennium: Fund Directors and Fund Myths, The Vanguard Group to the '40 Act Institute of PLI (Practicing Law Institute), New York, NY, May 15, 2000, 15 pages.
Schwab, Charles, Now 7 Ways for a better Total Return for Your Money; Schwat 1, The Inventor's Asset Management Account, Charles R. Schwab, Charles Schwab & Co., Inc., 16 pages.
Smart Cards: Big Brother's Little Helpers, The Privacy Committee of New South Wales, No. 66, Aug. 1995.
The Campus Card Conundrum, Card Technology, Journal ISSN: 1093-1279, p. 25+, Feb. 1998, pp. 1-8.
Stoughton, The Gift of Credit, www.washingtonpost.com/wp-srv/business, Dec. 14, 1998.
Langheinrich et al., Unintrusive Customization Techniques for Web Advertising, Computer Networks, vol. 31, 1999, pp. 1259-1272.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa releases visa cash electronic purse specifications based on CEPS, www.visa.com/av/news/PRaamisc042099.vhtml, San Francisco, Apr. 20, 1999.
Machlis et al., Will smart cards replace ATMS?, Computerworld, printed Feb. 23, 2001, 3 pages.
Meridian Award Cards, JA8251.
Meridian—the leader in card marketing, JA8343.
Incenticard, JA8329.
Card Based Award Systems, JA8309.
Meridicard vs. Debit Cards, JA7917.
Award Card Comparision, JA7922.
How is it Different?, JA8331.
Definition of "Stored-value card" from Wikipedia, Retrieved from {URL: http://en.wikipedia.org/wiki/Stored-value_card] on Apr. 16, 2007.
Song, Time Magazine Article, Monday, Apr. 12, 2004, "A card that asks for ID", 1 page.
Credit Card News, "A store card issuer looks for lift from electronic gift certificates," Feb. 1, 1995, 2 pages.
"Associates First Capital Corporation", Hoover's Inc., The Industry Standard: The Newsmagazine of the Internet Economy, thestandard.net/companies/cpmpany-display, Apr. 6, 1999, 2 pages.
Brehl, "Banks issue cash-card pledge," The Toronto Star, Thursday, Oct. 9, 1997, 1 page.
Block, "Blockbuster running test of stored value card," The American Banker, Sep. 1, 1995, 2 pages.
Meece, "Boatmen's prepaid cards for worker-incentive firm," American Banker, Jul. 2, 1996, p. 12.
"Boatmen's floats stored value into the employee incentive waters," Debit card News, vol. 2, Issue 2, Jul. 16, 1996, 3 pages.
CardEx Incentives, The Future of Gifts & Incentives, Apr. 6, 1999, 15 pages.
Rosen, "Cash just isn't flexible enough," Express Technology, Friday, Feb. 10, 1995, 1 page.
Business Wire, Jan. 15, 1996, "CES/NaBANCO introduces stored value card technology; Blockbuster video is first merchant partner," 2 pages.
Britt, "Competing in auto lending," America's Community Banker, vol. 5, No. 11, pp. 33-37, Nov. 1996.
Card News, "D.C. area Safeway stores look for increase in sales volume and revenue with cards," vol. 6, No. 25, ISSN: 0894-0797, Monday, Dec. 30, 1991, 3 pages.
Piskora, "Debit cards seen poised for new markets," American Banker, Credit/Debit/ATM's, Tuesday, Mar. 7, 1995, p. 16.
Sanchez-Klein, "Electronic purse" alliance planned, Computerworld, Jul. 29, 1998, printed Feb. 23, 2001, 2 pages.
Business Times, "Electronic purse can free you from ATM drag," printed Feb. 23, 2001, 1 page.
News Clippings, "'Electronic purse card' to be launched tomorrow," New Straits Times, Sep. 18, 1999, printed Feb. 23, 2001, 3 pages.
Cards International, Jan. 30, 1996, "First data markets stored-value cards," p. 5.
Norris, First data unit develops blockbuster cash card, Omaha World Herald, Jan. 19, 1996, Sunrise Edition, p. 16.
Welcome to Card Express, The CardEx Incentive Card, as disclosed in the CardEx web site archived by web.archive.org on Feb. 7, 1998 [http://web.archive.org/web/*/http://www.cardex.com], retrieve Oct. 18, 2003, 8 pages.
Welcome to Card Express, CardEx web site archived by web.archive.org on Oct. 31, 1996 [http://web.archive.org/web/*/http://www.cardex.com], retrieve Oct. 18, 2003, 7 pages.
Jeffrey M. Lacker, "Stored Value Cards: Costly Private Substitutions for Government Currency", Economic Quarterly, 1996, 17 pages.
"The Evolution of a New Consumerism", Chain Store Age, vol. 73, pp. 8-9, Jun. 1997, 1 page.

Fickenscher, "Amex prepaid offering is latest card for firms regarding employees", American Banker, vol. 161, No. 151, Aug. 8, 1996, 2 pages.

"Welcome to Swiftgift", Swiftgift, www.swiftgiftcard.com, Dec. 8, 1998, 10 pages.

Lzarony, "Stuck for a gift? Give a prepaid credit card", www.bankrate.com, Dec. 21, 1998, 1 page.

Coulton, "Incentives field moving to card-based series 14", American Banker, Mar. 26, 1998, 3 pages.

Business Travel News, "Maritz gets mastercard's stamp of approval", Aug. 19, 1996, 2 pages.

Spurgin, "Sopininmon! or What's happening in the retail credit card environment", Credit World Journal, Apr. 1997, 7 pages.

AT&T Marketing, "Universal card free lifetime membership extended 3 months", www.att.com/press/0297/970217.csa.html, Dec. 4, 1990, 2 pages.

Chain Store Age Executive with Shopping Center Age, "More retailers turn to co-branding", Feb. 1, 1995, 3 pages.

Introducing SpendingMoney(TM), Armetta: Marketing & Design Product Concept Report, Oct. 9, 1996, 15 pages.

First USA Platinum Connect, First USA Bank, First USA Promotional Mailing, Oct. 1997, 6 pages.

Introducing the First USA Platinum Connect Card, First USA Promotional Mailing, Dec. 1997, 6 pages.

Here's the calling convenience you asked for: 1-800-call-AT&T . . . For All Calls, Appendix A: for Card Carriers, 7 pages.

Miriam Krenin Souccar, Smart Cards: $1^{st}$ Union Smart Card Pilot Enlists a Second Army Base, American Banker, 3 pages.

First Union Issues Smart Cards to Fort Benning Recruits, CardFax, 1 page, Mar. 26, 1999.

Emerson Brown and Jim Baum, Purchasing Card Magic: Eli Lilly Finds Accounts Payable Flying High With Plastic, Corporate Cashflow, 4 pages, Nov. 1994.

Christine Dugas, Payroll May Ask: Paper or Plastic?, USA Today, 3B, Aug. 14, 2001, 1 page.

Rachel Konrad, Associated Press, IBM had a bunch of unusual ideas in 2003, printed from Philly.com on Jan. 21, 2004, posted on Tues., Jan. 13, 2004, 2 pages.

Incentive firms find debit cards a rewarding experience (Off-line debit card issuers converge efforts with companies looking for effective incentives to boost employee productivity and to motivate individuals to buy their products), Debit Card News, vol. 3, No. 11, Nov. 28, 1997, (Author unknown), 3 pages.

News Release, For Release: Monday, Feb. 17, 1997, New 1-800-Call-ATT campaign promotes one number for all calls, 2 pages.

S. P. Miller et al., Section E.2.1: Kerberos Authentication and Authorization System, Project Athena, Cambridge, Massachusetts, Dec. 21, 1987, 39 pages.

Swift Gift 'Wows' Internet Shoppers, Wed., Dec. 2, 1998, PR Newswire, 1 page. (Author Unknown).

ECARD, Frequently asked questions, printed Feb. 23, 2001, 7 pages.

Machilis, Computerworld, "Have it the 'smart' way: Burger King program drives smart-card use,", printed Feb. 23, 2001, 1 page.

Press Release, Mar. 5, 2004, Payment data systems files patent on debit card payment solution, American City Business Journals, 1 page.

Press releases '99, "Proton world and Europay to co-operate in creation of new CEPS-compliant E-purse application," printed Feb. 23, 2001, Waterloo, Belgium, Jun. 28, 1999, 2 pages.

SCIA (Smart Card Industry Association), About Smart Cards, "Electronic Purse," printed Feb. 23, 2001, www.scia.org, 1 page.

Cordis, PACE IST-1999-11531 PACE, "Purse application for cross border use in euro," printed Feb. 23, 2001, www.cordis.lu, 3 pages.

SK100 Smart Card Electronic Purse Balance Reader, printed Feb. 23, 2001, 1 page.

Press Release, Apr. 21, 1997, Smart card for loyalty and e-purse applications eclipses capability of conventional mag-stripe cards, printed Feb. 23, 2001, 3 pages, www.1.slb.com.

SmartAxis, Load cash on to your e-purse card, Supported Currencies and Schemes, printed Feb. 23, 2001, www.smartaxis.co.uk, 9 pages.

"The Electronic Purse Reaches the Car Park", printed Feb. 23, 2001, 2 pages.

Stuber, Bank of Canada, "The electronic purse: An overview of recent developments and issues," Technical Report No. 74, Jan. 1996, printed Feb. 23, 2001, www.bankofcanada.ca, 2 pages.

ICL, Understanding the benefits, "Smartcity offers a number of important benefits to both the card issuers and the customers," printed Feb. 27, 2001, www.icl.com, 2 pages.

Visa first to launch electronic purse load via GSM mobile phone, Johannesburg, Apr. 7, 1999, printed Feb. 23, 2001, www.cellular.co, 4 pages.

Hansell, New York Times, "Visa to unveil electronic purse cards," printed Feb. 23, 2001, 2 pages.

Machlis et al., "Will smart cards replace ATMs?," Computerworld, printed Feb. 23, 2001, 3 pages.

Hotchkiss, D. Anne, "ATM's at the head of their class," Bank Marketing, vol. 29, No. 3, pp. 26-32, Mar. 1997.

Power, Denise, "Loehmann's Complies Shopper Data via Credit Card", DNR, vol. 28, No. 3, p. 6, Jan. 7, 1998.

Anonymous. :Association of Incentive Gift Certificate Suppliers, Incentive, vol. 169, No. 8, pp. SS1-SS23, Aug. 1995.

"Smart Cards Forging into Credit Card Market", Card News, vol. 10, No. 6, p. 1(3), Apr. 3, 1995.

CardEx Incentives, www.cardex.com, Apr. 6, 1999.

Block, First Data Subsidiary Creates Payroll Card for the Bankless, LexisNexis Academic, Credit/Debit/ATMs, p. 10, Mar. 21, 1997.

Hamey, Kenneth, Home Asset Management Accounts Link Mortgages Equity Lines.

Incentive gift Card: Another way to give the gift of choice!, Incentive, Aug. 1995, 2 pages.

O'Conner, Maritz Gets MasterCard's Stamp of Approval, Business Travel News, Aug. 19, 1996, 2 pages.

More Retailers Turn to Co-Branding, Chain Store Age Executive with Shopping Center Age, Feb. 1, 1995, 3 pages.

Allen et al., Overview of Smart Cards and the Industry, Smart Cards: Seizing Strategic Business Opportunities, Chapter 1, p. 2-20, Irwin Professional Publishing, 1997.

Proton world and Europay to co-operate in creation of new CEPS-compliant e-purse application, Press Release 1999, Waterloo, Belgium, Jun. 28, 1999, 2 pages.

Souccar, Smart Cards: 1st Union Smart Card Pilot Enlists a Second Army Base, American Banker, Digital Frontiers, vol. 164, No. 61, Mar. 31, 1999, 3 pages.

Rossman, Kenneth, Summary Appraisal of Real Property.

Key, Swift Gift 'Wows' Internet Shoppers, PR Newswire, www.key.com/swiftgift/home.html, Dec. 2, 1998, 1 page.

Universal Card free lifetime membership extended 3 months, AT&T Marketing, www.att.com/press/0297/970217.csa.html, Dec. 4, 1990, 2 pages.

First Amended Answer and Counterclaims to JP Morgan Chase's First Amended and Supplemental Complaint for Declaratory Judgment and Patent Infringement dated Dec. 10, 2008.

Unknown, Debit Card News: "Paperless Trail Leads Debit to a Check-Free Payroll Program", vol. 3, No. 12, Dec. 16, 1997.

Alaska Housing Finance Corporation Quarterly Unaudited Financial Statements with Summarized Financial Information for Jun. 30, 2004, and Request for Information Banking Services, Mar. 31, 2005, Bates Nos. ACS-00000143-ACS-00000231.

Answer and Counterclaims to JP Morgan Chase's Second Amended and Supplemental Complaint for Declaratory Judgment and Patent Infringement in the United States District Court for the District of Delaware, Civil Action No. 08-189-SLR, Public Version filed May 8, 2009.

Answer to ACS's Third Amended Counterclaims in the United States District Court for the District of Delaware, Civil Action No. 08-189-SLR, dated May 15, 2009.

Authorization of Financial Agent and Terms of Performance: Debit Card Application for Houston, Texas, Authorization of Financial Agent and Terms of Performance, executed on Sep. 26, 1991, Bates Nos. ACSTRES0000003-ACSTRES0000012.

Bowen, C. "Welfare Agencies Seek Aid From Smart Cards", Card Technology, vol. 7, No. 11, pp. 74-76, Oct. 2002.

Brian Claire's Letter in Response to the Debit Card Services Invitation enclosing Best and Final Pricing for Citibank's T-DCS, dated Sep. 13, 1991, Bates Nos. ACSTRES0000047-ACSTRES0000072.

CardTrack Online: Coca-Cola ATM Money Cards, Retrieved from the Internet at http://www.cardweb.com/cardtrak/news/cf4_4a_97.html, Article dated Apr. 7, 1997.
Electronic Benefit Transfer: Debit Card Services, Invitation for Expressions of Interest, Jul. 24, 1991, Bates Bates Nos. ACSTRES0000013-ACSTRES0000046.
Foia #09-02-12 Responsive Records Book #11 containing Exhibit A, Technical Response, vol. One, Book VII to the Financial Agency Agreement of Jan. 24, 1996, Bates Nos. ACSTRES0002306-ACSTRES0002382.
FOIA #09-02-12 Responsive Records Book #2 containing Financial Agency Agreement of Jan. 24, 1996, dated Mar. 12, 2009, Bates Nos. ACSTRES0000106-ACSTRES0000121.
FOIA #09-02-12 Responsive Records Book #3 containing the Invitation for Expressions of Interest to Acquire EBT Services for the Southern Affiance of States, vol. I, Mar. 12, 2009, Bates Nos. ACSTRES0000122-ACSTRES0000440.
FOIA#09-02-12 Responsive Records Book #5 containing Exhibit A, Technical Response, vol. One, Book I, to the Financial Agency Agreement of Jan. 24, 1996, Mar. 12, 2009, Bates Nos. ACSTRES0000820-ACSTRES0001234.
FOIA #09-02-12 Responsive Records Book #7 containing Exhibit A, Technical Response, vol. One, Book III, to the Financial Agency Agreement of Jan. 24, 1996, dated Mar. 12, 2009, Bates Nos. ACSTRES0001345-ACSTRES0001371.
Hargreaves, the Evaluation of the Expanded EBT Demonstration in Maryland, vol. 1: System Startup, Conversion and Expansion—Final Report, May 1994.
Modification #1 to the Authorization of Financial Agent and Terms of Performance, Sep. 30, 1993, Bates Nos. ACSTRES0000073-ACSTRES0000080.
Modification #2 to the Authorization of Financial Agent and Terms of Performance, Mar. 25, 1994, Bates Nos. ACSTRES0000081-ACSTRES0000090.
Modification #3 to the Authorization of Financial Agent and Terms of Performance, dated Feb. 24, 1995, Bates Nos. ACSTRES0000091-ACSTRES0000097.
Modification #4 to the Authorization of Financial Agent and Terms of Performance, dated Apr. 1, 1996, Bates Nos. ACSTRES0000098-ACSTRES0000105.
Report to the Congress on the Application of the Electronic Fund Transfer Act to Electronic Stored-Value Products from the Board of Governors of the Federal Reserve System, Mar. 1997, Bates Nos. ACS00098020-ACS00098032.
Second Amended and Supplemental Complaint for Declaratory Judgment and Patent Infringement in the United States District Court for the District of Delaware, Civil Action No. 08-189-SLR, filed Apr. 14, 2009.
Sessums, "Unbanked" Citizens Draw Government Attention, Community Investments, vol. 9, No. 4, (1997), Bates Nos. ACS00280762-ACS00280768.
Wenninger et al, The Electronic Purse, Current Issues in Economics and Finance, published by the Federal Reserve Bank of New York, vol. 1, No. 1, Apr. 1995, Bates Nos. ACS00098037-ACS00098042.
Wood and Smith, "Electronic Transfer of Government Benefits", Federal Reserve Bulletin, vol. 77, No. 4, pp. 2003-2217, Apr. 1991.
Deposition of Kim Slater dated May 29, 2009 in the matter of *JPMorgan Chase & Co. et al.* v. *Affiliated Computer Services, Inc.* In the United States District Court for the District of Delaware, Civil Action No. 08-189-SLR—Redacted Version.
Statement of Brian Kibble-Smith, House Committee on Ways and Means, Apr. 5, 2006.
Cheney and Rhine, "How Effective Were the Financial Safety Nets in the Aftermath of Katrina," Discussion Paper Payment Cards Center, Federal Reserve Bank of Philadelphia, Jan. 2006.
A Survey and White Paper of the EBT Industry Council, "Debit and Stored Value Cards for Government: A Growing Trend but States Could Do More," EFTA, Nov. 2006.
"In Time of Need: A National Strategy for Disaster Relief Cards," prepared by JPMorgan Chase Treasury Services—Public Sector, Jan. 26, 2007.

"In Time of Need: A National Strategy for Disaster Relief Cards," Abstract, prepared by JPMorgan Chase Treasury Services—Public Sector, Jan. 26, 2007.
Request for Information submitted to Department of Health and Human Services by JPMorgan Electronic Financial Services, Request for Information for EBT Services, Aug. 10, 2006.
Commercial Card Products Credit Policy, dated effective Oct. 15, 2002, Bates Nos. JPMC-ACS-02060767-02060785—Redacted Version.
Bank One Commercial Card Services—Prepaid Card, Chart of Key Prepaid Card Competitors, Sep. 22, 2003, Bates Nos. JPMC-ACS-02060729-02060739—Redacted Version.
Bank One Commercial Card Services—Prepaid Card, Chart of Key Prepaid Payroll Card Competitors, Sep. 22, 2003, Bates Nos. JPMC-ACS-02060584-02060594—Redacted Version.
Pre Paid Gift Card—Growth, Review Document, Bank One, Mar. 16, 2004, Bates Nos. JPMC-ACS-02060790-02060812—Redacted Version.
"Prepaid Gift Cards," The Nilson Report, Issue 680, Nov. 1998.
Stipulation of Partial Dismissal in the United States District Court for the District of Delaware, Civil Action No. 08-189-SLR, Nov. 17, 2009.
"On the Way," CardFax Journal, LexisNexis Academic, Mar. 31, 1997.
"New Debit Card is Introduced to Serve 'Unbanked' Workers," Gethan Ward, The Tennessean, Lexis, Jun. 23, 1999.
Emerging Electronic Methods for Making Retail Payments, A CBO Study, Congressional Budget Office, Jun. 1996.
CCS Times, vol. 2, No. 1, Jan./Feb. 1997.
CCS Time, vol. 2, No. 2, Mar./Apr. 1997.
Direct Payment Card, Final Report for the period Apr. 1, 1992 to Sep. 30, 1997, Department of the Treasury, Financial Management Service, Sep. 30, 1997.
Advisory Opinions, FDIC—93—35, Jun. 28, 1993.
DPC Argentina Pilot Evaluation, Data from May 1, 1995-Jan. 31, 1996, Citibank, Jul. 11, 1996.
Top Line Report, Direct Payment Card Focus Groups, Product Evaluation, Inc, Jul. 19, 1994.
Innovations in American Government, 1995 Awards Program Semifinalist Application, EBT Direct Payment Card, Facsimile Transmittal, Department of the Treasury, Financial Management Service, May 8, 1995.
Paychex Access MasterMoney Card, Card issuance information, Oct. 24, 2000, Redacted Version.
SwiftGift Card, R. McKinley, CardTrak News, Nov. 24, 1998, available at: cardtrak.com/new/1998/11/24/swiftgift_card.
Final Office Action mailed Jun. 17, 2009 in co-pending U.S. Appl. No. 11/443,289.
Non-Final Office Action mailed Oct. 2, 2008 in co-pending U.S. Appl. No. 11/443,289.
Final Office Action mailed Feb. 20, 2008 in co-pending U.S. Appl. No. 11/443,289.
Non-Final Office Action mailed Jun. 11, 2007 in co-pending U.S. Appl. No. 11/443,289.
Final Office Action mailed Jun. 17, 2009 in co-pending U.S. Appl. No. 11/619,908.
Non-Final Office Action mailed Oct. 2, 2008 in co-pending U.S. Appl. No. 11/619,908.
Final Office Action mailed Jan. 31, 2008 in co-pending U.S. Appl. No. 11/619,908.
Non-Final Office Action mailed Jun. 7, 2007 in co-pending U.S. Appl. No. 11/619,908.
Final Office Action mailed Dec. 7, 2009 in co-pending U.S. Appl. No. 10/268,763.
Non-Final Office Action mailed Jan. 22, 2009 in co-pending U.S. Appl. No. 10/268,763.
Final Office Action mailed Apr. 28, 2008 in co-pending U.S. Appl. No. 10/268,763.
Non-Final Office Action mailed Jul. 19, 2007 in co-pending U.S. Appl. No. 10/268,763.
Siegel, Joel G., et. al., Accounting Handbook, Second Edition (1995).
The State of Arkansas, Arkansas Code of 1987 Annotated (1999).

E-Loan, Auto Loan Rates, retrieved from the Internet on Sep. 30, 2008.
Haddad, Charles, et al., Congratulations, Grads—You're Bankrupt; A Marketing Blitz Buries Kids in Plastic and Debt, May 21, 2001.
Cardweb.Com, Daily Payment Card News (2004).
Sherer, Paul M., Deals & Deal Makers Web Ventures Seek to Facilitate Business Credit, Private Equity, Nov. 8, 1999.
Debit Card News—Paperless Trail Leads Debit to a Check-Free Payroll Program, vol. 3, No. 12, Dec. 16, 1997.
Lennox, Graeme, Don't Be Tempted by the Urge to Splurge: Zero Rates Sound Great But You'll Pay Dearly in the End, Jul. 2001.
E-Loan, Frequently Asked Questions (2001).
Ostroff, Jeff, Guide to Buying New Cars, Used Cars, Dealer Scams, Feb. 2001, p. 1-7.
Kilian-Kehr, Roger, Mobile Security with Smartcards, Dissertation, Apr. 8, 2002.
Kleege, Stephen, Visa Unveils Co-Branding Offensive (Visa International, Visa U.S.A. Inc.), American Banker, v. 159, n. 43, Mar. 4, 1994 (www.dialogclassic.com/MainFrame.jsp, pp. 1-3).
Lewis, David, Mortgage Lending Optimized, IntternetWeek, Issue 858, Apr. 23, 2001.
Feldman, Judy, Pay by Check Over the Phone or Net, Oct. 1999.
Youll, James, Peer to Peer Transactions in Agent Mediated Electronic Commerce, Aug. 2001.
Wolf, Harold A., Personal Finance, Sixth Edition, (1981).
American Bankers Association, The Bank Credit Card Business, (1996).
Nilson, H. Spencer, The Nilson Report, Nov. 1998.
Unknown, Unknown, Thai Smart Card to Expand Abroad (Smart Loyalty's Smart Bonus Program has 300,000 Cardholders in Thailand, the company plans to expand into markets that include Australia and Malaysia), Cards International, n. 183 p. 5, Sep. 22, 1997.
Yee, Bennet, Using Secure Coprocessors, May 1994.
Vivo Tech, ViVOtech, Inc. RF-Based Contactless Payment: A more convenient way to pay, White Paper—Version 2.0, Apr. 2004.
Wood, John et. al., Wood, et al., Electronic Transfer of Government Benefits, Federal Reserve Bulletin, pp. 203-217, Apr. 1997.
Bowen, Cathy, Welfare Agencies Seek Aid From Smart Cards, p. 74, Oct. 2002.

* cited by examiner

DEBIT PURCHASING OF STORED VALUE CARD FOR USE BY AND/OR DELIVERY TO OTHERS

RELATED APPLICATIONS

This patent application is a Continuation of U.S. patent application Ser. No. 10/987,086, filed on Nov. 15, 2004 entitled "DEBIT PURCHASING OF STORED VALUE CARD FOR USE BY AND/OR DELIVERY TO OTHERS", which is a continuation of U.S. patent application Ser. No. 10/441,067, filed on May 20, 2003, now U.S. Pat. No. 6,892, 187, which is a continuation of U.S. patent application Ser. No. 09/102,044, now U.S. Pat. No. 6,615,189 which are hereby incorporated by reference in their entirety.

FIELD OF THE INVENTION

This invention relates to a system for purchasing or transferring of stored value or debit purchasing cards, which can be pre-arranged to be given as a gift to a designated recipient.

BACKGROUND OF THE INVENTION

On many occasions, consumers, other bank customers, credit card holders, and other persons find it is desirable to arrange for another person, perhaps a relative, to have access to a specified sum of money. For example, a parent might want to arrange for a child to have access to money when the child is taking a trip or going away to college. One may also find it desirable to mail a gift to another person who is geographically distant. In these and other cases, it is often undesirable to give away or send cash. If lost or stolen, cash is practically unrecoverable. Traveler's checks are also undesirable as they must be purchased at a bank and are not acceptable for many types of purchases. Gift certificates are also undesirable because they require the recipient to purchase from the merchant that issued the gift certificate. These and other drawbacks exist to the aforementioned alternatives.

SUMMARY OF THE INVENTION

An object of the invention is to overcome these and other drawbacks in existing purchase schemes.

Another object of the invention is to provide a method for issuing a purchase card comprising: presenting a purchaser with the opportunity to buy the purchase card, determining whether the purchaser has sufficient funds to pay for the purchase card, creating a purchase card account for a recipient designated by the purchaser; and issuing the purchase card.

A further object of the invention is to provide a purchase card where the recipient activates the purchase card.

A further object of the invention is to provide a purchase card where the purchase card account contains a monetary amount determined by the purchaser of the purchase card.

A further object of the invention is to provide a purchase card where money can be added to the balance of an issued purchase card account.

A further object of the invention is to provide a purchase card where the purchase card is activated when the issuer of the purchase card is notified that the recipient has received the purchase card.

A further object of the invention is to provide a purchase card where the issuer of the purchase card notifies the purchaser that the recipient has received the purchase card.

A further object of the invention is to provide a purchase card where the purchaser may designate with which merchants the purchase card may be used.

A further object of the invention is to provide a purchase card where the purchase card is activated for a predetermined period of time.

Another object is to provide a method for issuing a purchase card as a rebate award comprising: issuing a credit card to a cardholder, said credit card being associated with a sponsor. calculating a rebate amount based upon cardholder purchases made with said credit card, issuing a purchase card to a cardholder or to a recipient designated by said cardholder, said purchase card having a purchase value determined by said rebate amount.

A further object of the invention is to provide a purchase card where the recipient of the purchase card activates the card.

A further object of the invention is to provide a purchase card where the recipient activates the purchase card by notifying the issuer that the recipient has received the purchase card.

A further object of the invention is to provide a purchase card where the purchase card is activated for a predetermined period of time.

A further object of the invention is to provide a purchase card where the rebate is calculated based on all purchases made with the credit card.

A further object of the invention is to provide a purchase card where the rebate is calculated based on purchase from the sponsor made with the credit card.

A further object of the invention is to provide a purchase card where the sponsor notifies the issuer of the amount of rebate due a credit card holder, and the issuer creates a purchase card in that amount.

A further object of the invention is to provide a purchase card where the rebate is based on the monetary value of the purchases.

Another object of the present invention is to provide a method for converting a purchase card into a credit card comprising: creating a purchase card account for a recipient designated by the purchaser; issuing the purchase card; receiving a request from the recipient to convert the purchase card into a credit card; determining whether the recipient meets predetermined credit criteria to convert the purchase card into a credit card; creating a credit card account; and converting the purchase card into a credit card.

A further object of the invention is to provide a purchase card where the balance of the purchase card account is transferred to the credit card account.

A further object of the invention is to provide a purchase card where the credit cards is immediately activated upon being converted from a purchase card.

Other objects and advantages exist for the present invention.

DETAILED DESCRIPTION OF THE PREFERRED EMBODIMENTS

Figure 1:
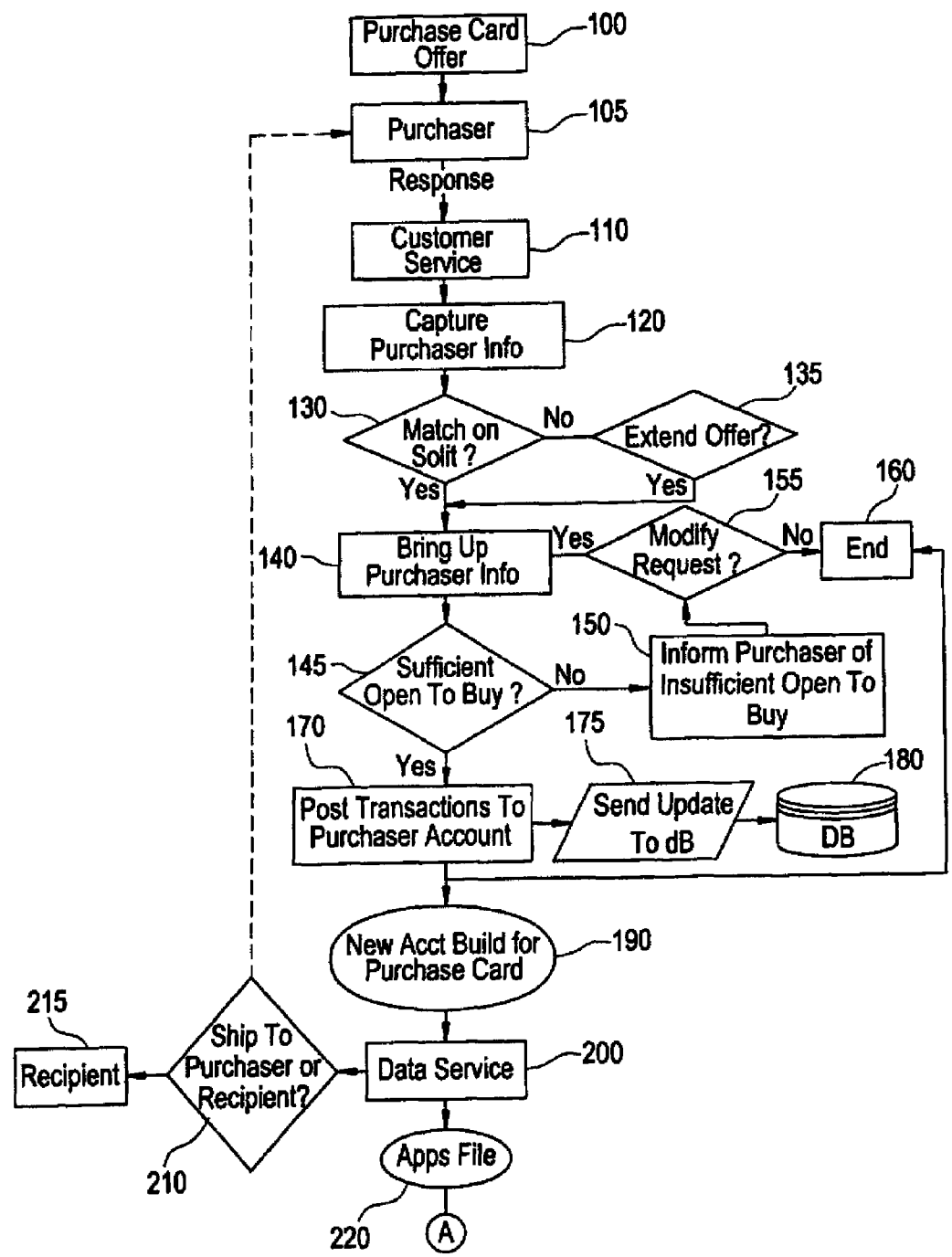
FIG. 1 shows a flow diagram for a portion of the purchase card system.

One embodiment of the purchase card system is shown in FIG. 1. In this embodiment the purchase card process begins with an offer to purchase a gift card at step 100. The offer may be in any suitable form that would notify prospective purchasers 105 of the availability of the purchase card. For example, a written solicitation may be mailed or otherwise distributed to potential purchasers 105. The offer may also be in the form of oral notification, for example, a telephone call to prospective purchasers 105. Alternatively, the offer may be published over a computer network, for example, on an Internet Web site. Other forms of offering the sale of a purchase card are also possible. In one embodiment of the invention, offers are made to prospective purchasers who already have a financial relationship with the offeror. Other potential purchasers may also be offered the opportunity to obtain a purchase card.

The offer may be accepted by a purchaser 105 by notifying a customer service center 110. The acceptance may be in any form acceptable to the customer service center 110. For example, the purchaser may mail, fax, or otherwise transmit a written acceptance, telephone an acceptance, or electronically transmit, for example, via Web Site, an acceptance by computer or other suitable device. At step 120, the customer service center 110 receives pertinent information to identify the purchaser 105 and the purchaser's desired spending limit for the purchase card. For example, the customer service center may identify the purchaser 105 by name, address, credit card account number, social security number, other unique identifiers or a combination of identifiers.

At step 130, the customer service center 120 is checked to verify that the caller or purchaser was included in the solicitations for this program. If the caller or purchaser was not originally solicited, customer service 120 determines whether to extend an offer in step 135.

If the caller or purchaser was solicited 130, certain purchaser 105 information may be accessed at 140. If, for example, the purchaser wishes to pay for the purchase card with a credit card, the purchaser's credit card account information may be accessed. For example, the purchaser's available credit limit may be accessed at 145 to verify that sufficient credit is available to cover the spending amount of the purchase card. If the available credit is insufficient, the purchaser 105 may be so informed at 150. The purchaser 105 may be given the opportunity to modify the purchase card spending amount, at 155, in order to ensure that the purchase amount does not exceed the available credit.

The process may terminate at 160 it for example, the purchaser 105 does not wish to modify the purchase amount.

After it has been determined that the purchaser's available credit is sufficient, a transaction may be posted to the purchaser's credit card for the amount of the purchase at 170. In another embodiment of the present invention, a purchaser may use a check, cash, or other financial methods to obtain a purchase card. Regardless of the purchasing method, the issuer of the purchase card must determine whether the purchaser has sufficient funds to purchase the card.

When the purchase card is paid for by credit or bank account, the purchaser's account balance is updated at 175 to reflect the purchase. The account balance information, as well as information identifying the purchaser 105 and the recipient, may be stored in a retrievable and accessible fashion. For example, the information may be stored in computer database 180. After the purchaser 105 has paid (or authorized payment) for the purchase card, and it is posted to a credit card account, the acceptance process is complete and the acceptance process terminates at 160.

An account for the purchase card is created at 190. This may be performed by a third party processor that establishes and manages purchase card accounts. for example, at 200. Creation of the purchase card account may comprise various actions, such as, recording the recipients 215 name, address and phone number, imprinting a card with an account number, a recipient name and an expiration date, encoding the card to record the purchase value stored thereon, and other actions, such as, for example, preparing account fulfillment documents (e.g. card carrier activation, etc.).

When the purchase card account is complete, the card is delivered. In one embodiment of the invention, card may be affiliated with a particular network, such a credit network, or debit network. For example, a card may be affiliated with the VISA® network. The delivery may be to the purchaser 105 or to the recipient 215, as shown at 210. The place of delivery may be arranged during the initial purchase of the card or other suitable time before delivery.

Information regarding an account is sent to account file 220, where an account can be monitored. In one embodiment, account file 220 allows monitoring of the current balance of an account, any activity in the account, including debits and credits, transaction updates, and the like. Other information about an account, such as purchase dispute resolutions, the history provided by the customer, and account status, may also be monitored.

Figure 2:
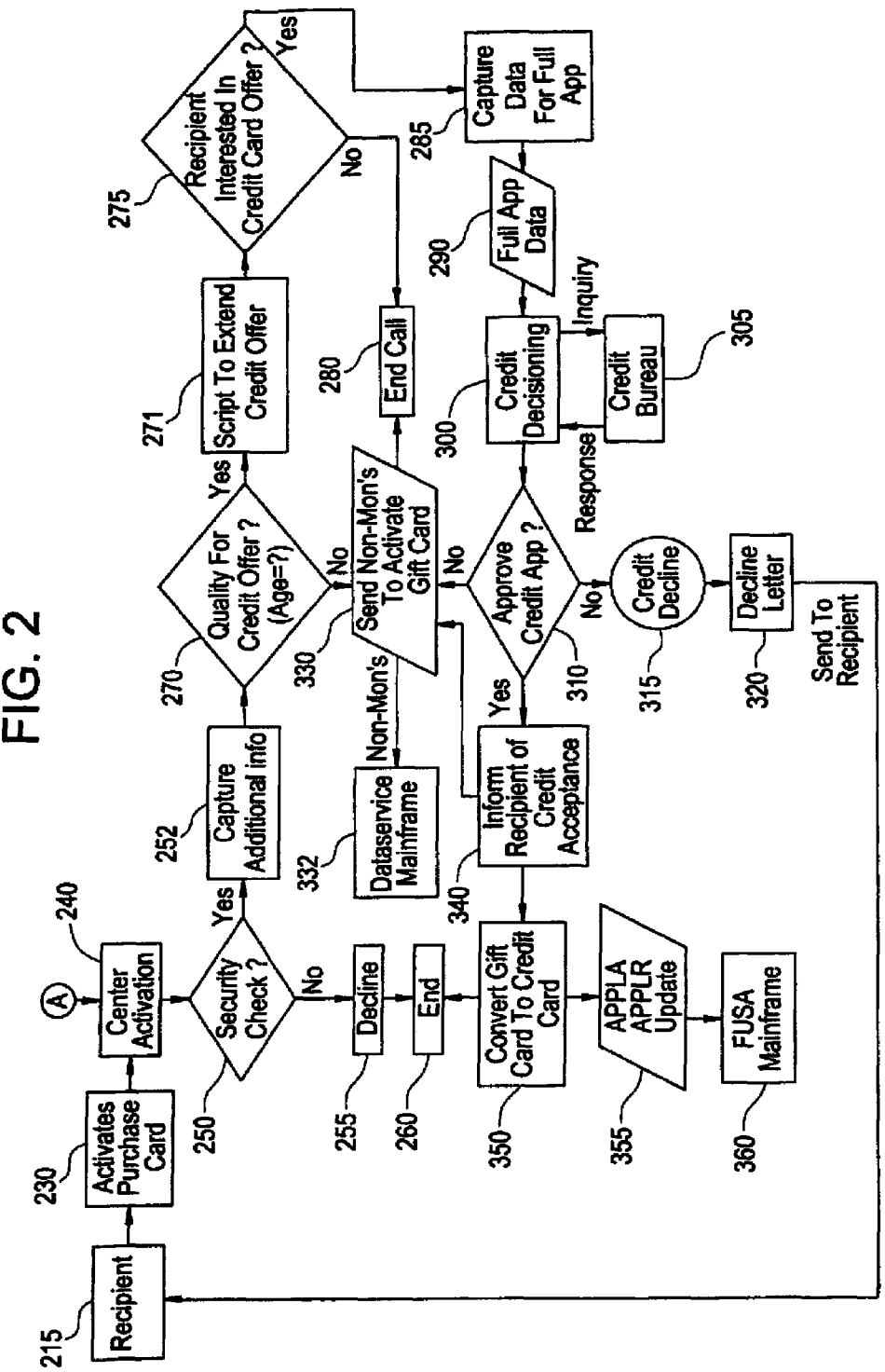
FIG. 2 shows a flow diagram for another portion of the purchase card system.

Before the purchase card can be used to make purchases, it must be activated as shown in FIG. 2 at 230. Activation may be accomplished in any suitable manner. For example, the recipient 215 of the card may place a telephone call to an activation center 240. Activation center 240 may act as a telemarketing vendor by verifying information about the recipient (i.e. name, address, telephone number, etc.) before the purchase card is activated. The activation center 240 may then transmit the data about the recipient to Data Service 200 to activate the purchase card for use. Activation center 240 may also modify information about a recipient, such as, for example, a change of address. Other forms of activation, such as by computer network may also be used.

During activation certain verifications may be made at 250 to ensure that the intended recipient 215 is the person attempting to activate the purchase card. These security checks 250 may entail questions about personal information (e.g., name, address, telephone number, etc.) or may utilize other well known methods of authenticating the recipient 215. If the person attempting to activate the purchase card does not pass the security check 250, the purchase card will be denied activation at 255 and the activation process may terminate at 260. If the person attempting to activate the purchase card passes the security check 250, they may be prompted at 252 for more information. The information may be used for subsequent security checks, should they be required, or to verify or complete the purchase card account information.

After activation the purchase card is ready for use. In some embodiments of the invention the activation process will end at this point. The recipient 215 may now use the purchase card to make purchases where ever, for example, VISA® cards are accepted. Each time a purchase is made using the card, the amount of the purchase will be debited from the card's available balance. The purchase card will continue to operate as long as a positive balance remains on the card. Some embodiments of the purchase card may have the capacity to have additional purchase value added to them after they have been activated.

If the recipient of a purchase card is someone other than the purchaser, the issuer of the card may notify the purchaser regarding various aspects of the card. For example, in one embodiment of the invention, the issuer could notify the purchaser that the purchase card has been received and activated by the intended recipient. An issuer may also notify a purchaser where the purchase card is being used, or what products are being purchased with the purchase card.

Some embodiments of the purchase card will include an expiration date. After the expiration date has passed the purchase card will be de-activated and cease to operate. In another embodiment of the present invention, a recipient or a purchaser of a purchase card may add to the balance of the purchase card account. This may take place in a manner substantially similar to the original purchasing of the purchase card. For example, a recipient of a purchase card may request that an amount be posted to the recipient's credit card and that the same amount then be credited to the recipient's purchase card account. Other methods of adding to the balance of a purchase card account may also be used.

Another embodiment of the invention allows the recipient 215 to convert the purchase card into a credit card. Conversion may be accomplished in the following manner. The recipient 215 calls the activation center 240 to activate the purchase card and the security check 250 may be performed in the usual manner. After passing the security check, the age of the recipient 215 is determined at 270. If the recipient 215 is an adult (e.g., over the age of 18) an offer to convert the purchase card into a credit card may be extended at 271. At step 275 the recipient 215 may decline the offer to convert, in which case the process may terminate at 280. If the recipient 215 elects to convert the purchase card to a credit card the activation center 240 may capture additional data 285 from recipient 215, in order to complete a credit card application. At step 290 the credit card application data is forwarded to a credit decisioning office 300. The credit decisioning office 300 may make inquiries to a credit bureau 305, for example, obtaining a credit report on the recipient 215. At 310 the decision is rendered whether to approve the credit card application. If the application for a credit card is declined at 315, the recipient 215 may be notified at 320. Notification may be in any suitable form, for example, a letter explaining the declined application may be mailed at 320 to the recipient 215. Other forms of notification may also be used to notify recipient 215 of the declined application.

Even though the credit card application is declined at 310, the purchase card is activated for use. At 330, the account settings allowing a card to be used at merchants are sent to the data service 200 and the card will be activated as a purchase card account. Information pertaining to the purchase card account is stored in a retrievable and accessible manner. For example, the purchase card account information may be stored in a computer 332.

If the decision at 310 is to accept the application for a credit card, the recipient 215 may be notified at 340. Again, notification may be in any suitable form, for example, a letter or other suitable notification. Regardless of the decision whether to convert the purchase card into a credit card, the purchase card is activated at the end of the activation call. If the purchase card is not already active, it may be activated at 345. At 350 the purchase card is converted to a credit card. The credit card will function in a manner usual for such credit instruments. For example, a credit limit may be assigned, periodic account activity statements may be generated and finance charges may be applied to any outstanding balance. In one embodiment, any remaining balance from the purchase card account may be transferred and applied to the credit card account. At 355 an update is sent to a retrievable data storage system, for example, computer 360. The update 355 sends credit card application decisions into a database.

In another embodiment of the purchase card, a financial institution (e.g., a bank) issues a credit card to a cardholder. The card may be a co-branded card issued in cooperation with a sponsor. In this embodiment, the sponsor offers a rebate to the cardholder based upon the dollar value amount of purchases made with the co-branded credit card. The rebate may apply to all purchases made or just to purchases made from the sponsor. The rebate may be calculated in a manner specified by the terms of the cardholder agreement or other disclosures to the cardholder. In one embodiment of the invention, disclosure about the rebate is provided to the cardholder in a separate form included with the cardholder agreement. For example, the sponsor may offer a flat percentage rebate for purchases made. In one embodiment of the invention, the card issuer calculates the rebate due the cardholder based on the balance paid.

In another embodiment, the sponsor notifies the financial institution of the amount of rebate to be awarded to the cardholder. The financial institution will then issue a purchase card for the amount of the rebate. The purchase card may be used for purchases in the above described manner, for example, everywhere VISA® is accepted, or the purchase card may be used for purchases solely with the sponsor or other designated entities.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for transferring cash from a sender to a receiver, the method comprising:

publishing an offer for a purchase card over a computer network;

receiving, by at least one computer processor, a request from the sender for the purchase card, wherein the sender is an individual;

creating, by at least one computer processor, an independent and separate account associated with the purchase card, which is associated with a predetermined transaction network;

providing the purchase card to the receiver, the receiver obtaining the purchase card in an unactivated state, wherein:

a) before the purchase card is provided, the purchase card is marked with a cardholder's name, an identification number, and indicia identifying the predetermined transaction network;

b) the purchase card is accepted for payment wherever cards associated with the predetermined transaction network are accepted; and c) the purchase card has an encodable portion for recording a variable amount of value;

receiving a contact over the computer network, from the receiver for activation of the purchase card;

receiving, from the receiver, security information;

activating, by at least one computer processor, the purchase card over the computer network;

crediting the purchase card with funds provided by the sender as an initial value by transferring the funds associated with the initial value into the independent and separate account and storing the funds in the independent and separate account, wherein the purchase card is usable by the receiver for transactions; and loading, subsequent to the funding of the initial value, the purchase card upon receiving a load request from the receiver or the sender.

2. The method of claim 1 wherein the encodable portion comprises a magnetic strip.

3. The method of claim 1 wherein the agent is a third party processor.

4. The method of claim 1 wherein the agent is an activation center.

5. The method of claim 1 wherein the purchase card is activated by the agent in response to the receiver contacting the agent by telephone and providing the security information.

6. The method of claim 1 wherein the purchase card is activated by the agent in response to the receiver contacting the agent through a network and providing the security information.

7. The method of claim 1 wherein the contact from the receiver is received through the Internet.

8. The method of claim 1 wherein the sender provides funds for the purchase card:
from a bank account, the funds credited to the purchase card being debited from the bank account;
the method further including updating the sender with transaction information related to the funds credited.

9. The method of claim 1, wherein the purchased card is purchased as a gift for the receiver.

10. The method of claim 1, wherein the request is received via the Internet.

11. The method of claim 1, wherein the offer is published on a web site on the Internet.

12. The method of claim 1, wherein the sender and the receiver are the same individual.

13. A method for transferring cash from a sender to a receiver, the method comprising:
publishing an offer for a purchase card over a computer network;
receiving, by at least one computer processor, over the computer network, a request from the sender for the purchase card, wherein the sender is an individual;
creating, by at least one computer processor, an independent and separate account associated with the purchase card, which is associated with a predetermined transaction network;
providing the purchase card to the receiver, the receiver obtaining the purchase card in an unactivated state, wherein:
a) before the purchase card is provided, the purchase card is marked with a cardholder's name, an identification number, and indicia identifying a sponsoring entity;
b) the purchase card is accepted for payment wherever cards associated with the predetermined transaction network are accepted; and
c) the purchase card has an encodable portion for recording a variable amount of value;
receiving a contact, from the receiver, to an agent for activation of the purchase card;
receiving from the receiver by the agent security information;
activating of the purchase card by the agent;
notifying the sender that the purchase card has been received;
receiving funds provided as an initial value by the sender; and
crediting the purchase card with the funds by transferring the funds associated with the initial value into the independent and separate account and storing the funds in the independent and separate account; and
loading, by at least one computer processor, subsequent to the funding of the initial value, the purchase card upon receiving a load request from the receiver or the sender.

14. The method of claim 13 wherein the encodable portion comprises a magnetic strip.

15. The method of claim 13 wherein the agent is a third party processor.

16. The method of claim 13 wherein the agent is an activation center.

17. The method of claim 13 wherein the purchase card is activated by the agent in response to the receiver contacting the agent by telephone and providing the security information.

18. The method of claim 13 wherein the purchase card is activated by the agent in response to the receiver contacting the agent through a computer network and providing the security information.

19. The method of claim 13 wherein the purchase card is activated by the agent in response to the receiver contacting the agent through the Internet and providing the security information.

20. The method of claim 13 wherein the sender provides funds for the purchase card from a bank account, the funds credited to the purchase card being debited from the bank account;
the method further including updating the sender with transaction information related to the funds credited.

* * * * *